United States Patent
Danko

(10) Patent No.: US 8,631,409 B2
(45) Date of Patent: *Jan. 14, 2014

(54) ADAPTIVE PARTITIONING SCHEDULER FOR MULTIPROCESSING SYSTEM

(75) Inventor: Attilla Danko, Ottawa (CA)

(73) Assignee: QNX Software Systems Limited, Ottawa, Ontario (CA)

( * ) Notice: Subject to any disclaimer, the term of this patent is extended or adjusted under 35 U.S.C. 154(b) by 1089 days.

This patent is subject to a terminal disclaimer.

(21) Appl. No.: 12/098,972

(22) Filed: Apr. 7, 2008

(65) Prior Publication Data

US 2008/0235701 A1 Sep. 25, 2008

Related U.S. Application Data

(63) Continuation of application No. 12/039,678, filed on Feb. 28, 2008, now Pat. No. 8,245,230, which is a continuation-in-part of application No. 11/371,634, filed on Mar. 8, 2006, now Pat. No. 7,870,554.

(60) Provisional application No. 60/662,070, filed on Mar. 14, 2005.

(51) Int. Cl.
*G06F 9/46* (2006.01)

(52) U.S. Cl.
USPC .......................................... 718/102; 718/104

(58) Field of Classification Search
None
See application file for complete search history.

(56) References Cited

U.S. PATENT DOCUMENTS

| | | |
|---|---|---|
| 4,908,750 A | 3/1990 | Jablow |
| 5,068,778 A | 11/1991 | Kosem et al. |
| 5,530,860 A | 6/1996 | Matsuura |
| 5,745,778 A | 4/1998 | Alfieri |
| 5,812,844 A | 9/1998 | Jones et al. |
| 5,845,116 A | 12/1998 | Saito et al. |
| 5,912,888 A | 6/1999 | Walsh et al. |
| 5,944,778 A * | 8/1999 | Takeuchi et al. ............... 718/100 |
| 6,003,061 A | 12/1999 | Jones et al. |
| 6,108,646 A | 8/2000 | Mohri et al. |
| 6,249,836 B1 | 6/2001 | Downs et al. |
| 6,301,616 B1 | 10/2001 | Pal et al. |

(Continued)

FOREIGN PATENT DOCUMENTS

| | | |
|---|---|---|
| WO | WO 03/052597 A2 | 6/2003 |
| WO | WO 2004/019205 A2 | 3/2004 |

OTHER PUBLICATIONS

Krten, Rob, "Getting Started with QNX 4: A Guide for Realtime Programmers," PARSE Software Devices, 1999, pp. 13-24.

(Continued)

*Primary Examiner* — Camquy Truong
(74) *Attorney, Agent, or Firm* — Brinks Gilson & Lione

(57) ABSTRACT

A symmetric multiprocessing system includes multiple processing units and corresponding instances of an adaptive partition processing scheduler. Each instance of the adaptive partition processing scheduler selectively allocates the respective processing unit to run process threads of one or more adaptive partitions based on a comparison between merit function values of the one or more adaptive partitions. The merit function for a particular partition of the one or more adaptive partitions may be based on whether the adaptive partition has available budget on the respective processing unit. The merit function for a particular partition associated with an instance of the adaptive partition scheduler also, or in the alternative, may be based on whether the adaptive partition has available global budget on the symmetric multiprocessing system.

15 Claims, 9 Drawing Sheets

(56) References Cited

U.S. PATENT DOCUMENTS

| | | |
|---|---|---|
| 6,385,636 B1 | 5/2002 | Suzuki |
| 6,415,333 B1 | 7/2002 | Vasell |
| 6,560,628 B1 | 5/2003 | Murata |
| 6,687,904 B1 | 2/2004 | Gomes et al. |
| 6,754,690 B2 | 6/2004 | Larson |
| 6,757,897 B1 | 6/2004 | Shi et al. |
| 6,785,889 B1 | 8/2004 | Williams |
| 6,859,926 B1 | 2/2005 | Brenner et al. |
| 6,910,213 B1 | 6/2005 | Hirono et al. |
| 6,948,172 B1 | 9/2005 | D'Souza |
| 6,950,848 B1 | 9/2005 | Yousefi'zadeh |
| 6,957,431 B2 | 10/2005 | Bollella et al. |
| 6,988,226 B2 | 1/2006 | Koning et al. |
| 7,051,329 B1 | 5/2006 | Boggs et al. |
| 7,058,951 B2 | 6/2006 | Bril et al. |
| 7,086,057 B2 | 8/2006 | Hayashi |
| 7,093,257 B2 * | 8/2006 | Berg et al. ............... 718/104 |
| 7,100,161 B2 | 8/2006 | Latour |
| 7,117,497 B2 | 10/2006 | Miller et al. |
| 7,134,124 B2 | 11/2006 | Ohsawa et al. |
| 7,222,343 B2 | 5/2007 | Heyrman et al. |
| 7,302,685 B2 | 11/2007 | Binns et al. |
| 7,380,039 B2 | 5/2008 | Miloushev et al. |
| 7,383,548 B2 | 6/2008 | Boon et al. |
| 7,421,691 B1 | 9/2008 | Hancock et al. |
| 7,464,379 B2 | 12/2008 | Kanai et al. |
| 7,472,389 B2 | 12/2008 | Smith et al. |
| 7,475,399 B2 | 1/2009 | Arimilli et al. |
| 7,506,361 B2 | 3/2009 | Kegel et al. |
| 7,512,950 B1 | 3/2009 | Marejka |
| 7,562,362 B1 | 7/2009 | Paquette et al. |
| 7,657,892 B2 | 2/2010 | Langen et al. |
| 2002/0062435 A1 | 5/2002 | Nemirovsky et al. |
| 2002/0078121 A1 | 6/2002 | Ballantyne |
| 2002/0078194 A1 | 6/2002 | Neti et al. |
| 2002/0083211 A1 | 6/2002 | Driesner et al. |
| 2002/0120661 A1 | 8/2002 | Binns et al. |
| 2002/0120665 A1 | 8/2002 | Alford et al. |
| 2002/0178208 A1 | 11/2002 | Hutchinson et al. |
| 2003/0061260 A1 | 3/2003 | Rajkumar et al. |
| 2003/0069917 A1 | 4/2003 | Miller |
| 2003/0088606 A1 | 5/2003 | Miller et al. |
| 2003/0154234 A1 * | 8/2003 | Larson ............... 709/107 |
| 2003/0208580 A1 * | 11/2003 | Presley ............... 709/223 |
| 2004/0143664 A1 | 7/2004 | Usa et al. |
| 2004/0186904 A1 | 9/2004 | Oliveira |
| 2004/0216101 A1 | 10/2004 | Burky et al. |
| 2004/0216113 A1 | 10/2004 | Armstrong et al. |
| 2004/0226015 A1 | 11/2004 | Leonard et al. |
| 2005/0004879 A1 | 1/2005 | Mathias et al. |
| 2005/0010502 A1 | 1/2005 | Birkestrand et al. |
| 2005/0081214 A1 | 4/2005 | Nemirovsky et al. |
| 2005/0210468 A1 | 9/2005 | Chung et al. |
| 2005/0283785 A1 | 12/2005 | D'Souza |
| 2006/0026594 A1 | 2/2006 | Yoshida et al. |
| 2006/0080285 A1 | 4/2006 | Chowdhuri |
| 2006/0130062 A1 | 6/2006 | Burdick et al. |
| 2006/0143350 A1 | 6/2006 | Miloushev et al. |
| 2006/0206881 A1 | 9/2006 | Dodge et al. |
| 2006/0206887 A1 | 9/2006 | Dodge et al. |
| 2006/0206891 A1 | 9/2006 | Armstrong et al. |
| 2006/0212870 A1 | 9/2006 | Arndt et al. |
| 2006/0218557 A1 | 9/2006 | Garthwaite et al. |
| 2006/0225077 A1 | 10/2006 | Anderson |
| 2006/0277551 A1 | 12/2006 | Accapadi et al. |
| 2007/0061788 A1 | 3/2007 | Dodge et al. |
| 2007/0061809 A1 | 3/2007 | Dodge et al. |
| 2007/0226739 A1 | 9/2007 | Dodge et al. |
| 2007/0271562 A1 | 11/2007 | Schumacher et al. |
| 2008/0126547 A1 | 5/2008 | Waldspurger |
| 2008/0196031 A1 | 8/2008 | Danko |

OTHER PUBLICATIONS

"QNX Operating System: System Architecture," QNX Software Systems, Ltd., 1997, pp. 37-47.

* cited by examiner

ADAPTIVE PARTITIONING SCHEDULER FOR MULTIPROCESSING SYSTEM

PRIORITY CLAIM

This application is a continuation of U.S. patent application Ser. No. 12/039,678, now U.S. Pat. No. 8,245,230, filed Feb. 28, 2008, which is continuation-in-part of U.S. patent application Ser. No. 11/371,634, now U.S. Pat. No. 7,870,554, filed Mar. 8, 2006, which claims the benefit of priority from U.S. Provisional Application No. 60/662,070, filed Mar. 14, 2005, all of which are incorporated herein by reference.

BACKGROUND OF THE INVENTION

1. Technical Field

The present invention is directed to a manner in which a processing system schedules the running of threads and the like. More particularly, the invention is directed to a system having adaptive partition scheduling for process threads.

2. Related Art

The kernel of an operating system may divide CPU resources so that each thread that is active in the system obtains an amount of CPU time to execute the corresponding process. The kernel may implement a scheduling system that determines how the available CPU time is allocated between multiple threads.

There are various types of process scheduling systems: a FIFO scheduling system; a round-robin scheduling system; and a sporadic scheduling system. In each system, a priority value may be assigned to each thread of a process that is executed by the CPU. High priority values are assigned to threads that may be important to the operation of the overall system while threads that may be less important to the operation of the system may have lower priority values. Whether the scheduling system gives a thread access to the CPU may also depend on the state of the thread. A thread may be ready or blocked (although other states also may be used). A thread may be ready for execution when conditions for it to run have been met. A thread may be blocked when it tries to initiate an operation that cannot be completed immediately. A blocked thread may wait for the completion of some event before going to a ready or running state.

In some operating systems, each thread in the system may run using any of the foregoing scheduling systems. The scheduling systems may be effective on a per-thread basis for all threads and processes on a node. Each thread may be assigned to a particular scheduling system type through the operation of the process/thread itself. This may provide the software designer with a degree of design flexibility. However, it may also involve a need for coordination between software designers implementing code for the same system. This coordination includes the assignment of priorities to the different threads as well as the scheduling system type assigned to each thread.

While the foregoing scheduling systems have advantages in different applications, they may experience deficiencies when used in certain system applications. When per-thread scheduling systems are used in real-time systems where the latencies of a process/thread have been planned solely through the assignment of priority levels, very long latencies for low-priority threads may occur. Malicious software processes may configure themselves for high priority execution and may preempt proper scheduling of lower priority threads. This problem also may occur during system development when a high priority thread malfunctions and enters an infinite loop. Global fair-share scheduling systems may avoid such problems, but lack the responsiveness needed for use in a real-time system. These scheduling systems may be more problematic when implemented in a multiprocessing system, such as a bound multiprocessing system.

SUMMARY

A symmetric multiprocessing system includes multiple processing units and corresponding instances of an adaptive partition processing scheduler. Each instance of the adaptive partition processing scheduler selectively allocates the respective processing unit to run process threads of one or more adaptive partitions based on a comparison between merit function values of the one or more adaptive partitions. The merit function for a particular partition of the one or more adaptive partitions may be based on whether the adaptive partition has available budget on the respective central processing unit. The merit function for a particular partition associated with an instance of the adaptive partition scheduler also, or in the alternative, may be based on whether the adaptive partition has available global budget on the symmetric multiprocessing system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
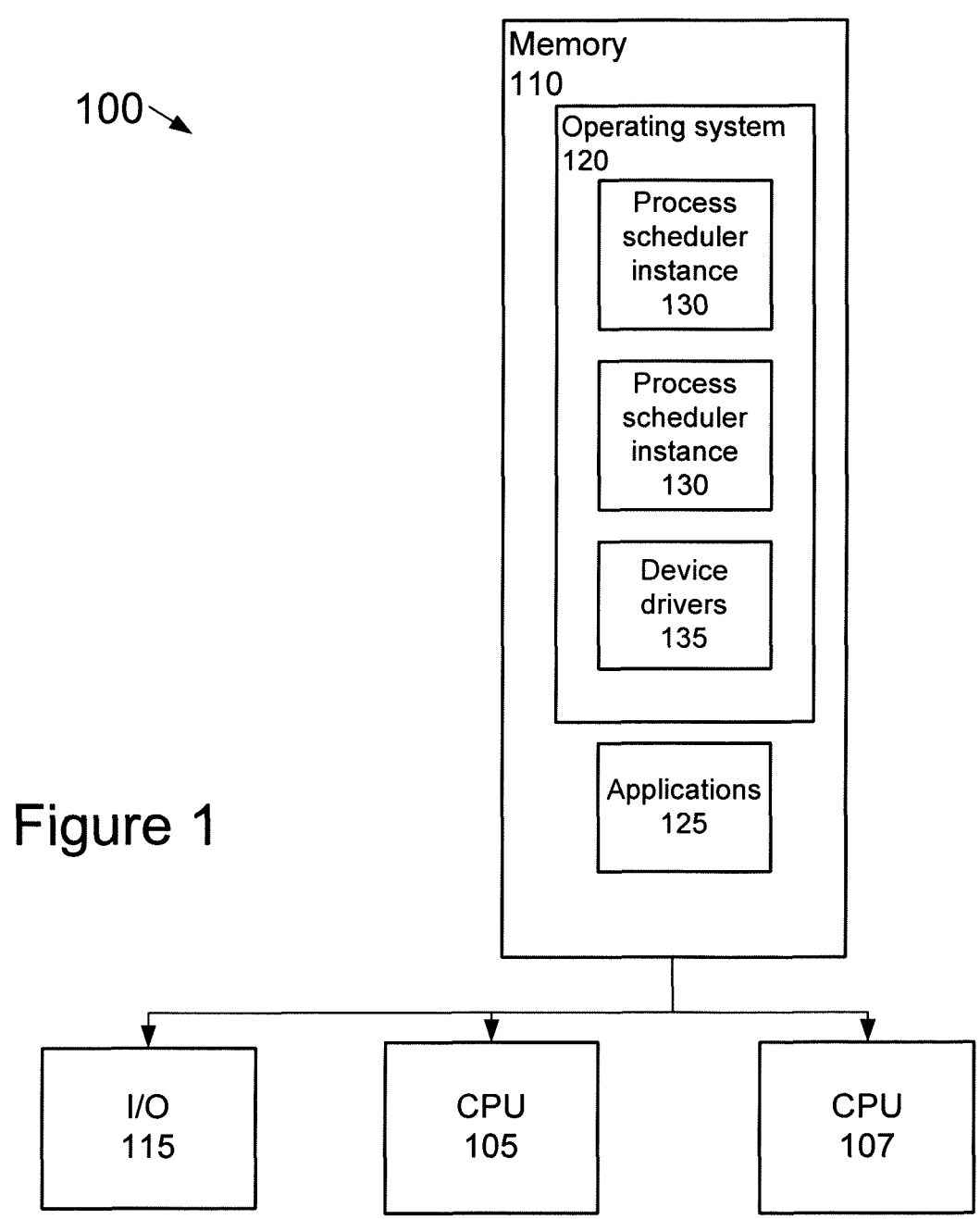
FIG. 1 is a diagram of one embodiment of a multiprocessing system that may execute an adaptive partition process scheduler.

FIG. 1 is a diagram of a multiprocessing system 100 that may execute adaptive partitioning of process threads.

Although additional processors may be employed, system 100 includes two processing units ("CPUs") 105 and 107 that may access software code stored in a local or remote memory 110. CPUs 105 and 107 may be arranged to access various devices/system components through one or more I/O interfaces 115. The devices/system components may include, for example, sensors, human interface devices, network nodes, printers, storage devices, or the like.

Memory 110 may be used to store, among other things, the software code that defines the functions that are to be executed by the system 100. Although memory 110 is shown as a single unit, it may be implemented as multiple memory units of the same or different memory type. For example, memory 110 may be implemented with multiple flash memory devices. Alternatively, or in addition, memory 110 may be implemented with singular and/or combinations of one or more flash memory devices, one or more hard disc storage devices, RAM, ROM, networked memory, and/or other memory types. A number of alternative memory device combinations may be used to implement memory 110.

Some of the software code may be stored in memory 110 and executed by CPUs 105 and 107 is represented in FIG. 1. The software code includes an operating system 120 and one or more software applications 125. In a symmetric multiprocessing system such as the one shown in FIG. 1, each CPU 105 and 107 may run separate instances of a process scheduler instance 130 and 135. CPU 105 may be associated with process scheduler instance 130 while CPU 107 may be associated with process scheduler instance 135. Additional instances of the process scheduler may be executed in systems having three or more CPUs.

In FIG. 1, the process scheduler instances 130 and 135, and device drivers 135 are included as portions of the operating system 120. The process scheduler instances 130 and 135, and device drivers 135, however, may be implemented as software modules that are separate from the operating system 120. Software applications 125 may establish the high-level functions that system 100 performs. Device drivers 135 may provide a hardware abstraction layer through which software applications 125 communicate with the hardware components of the system 100. The hardware components may include the components accessed through I/O interface 115.

Process scheduler instances 130 and 135 comprise the executable software code that allocates the processing time of the CPUs 105 and 107 ("CPU time") to each thread of the system 100. The processing time may be allocated so that each thread obtains an adequate amount of CPU time to execute the corresponding process. System 100 may be extended to any number of central processing units, where each central processing unit runs a corresponding instance of the process scheduler.

Figure 2:
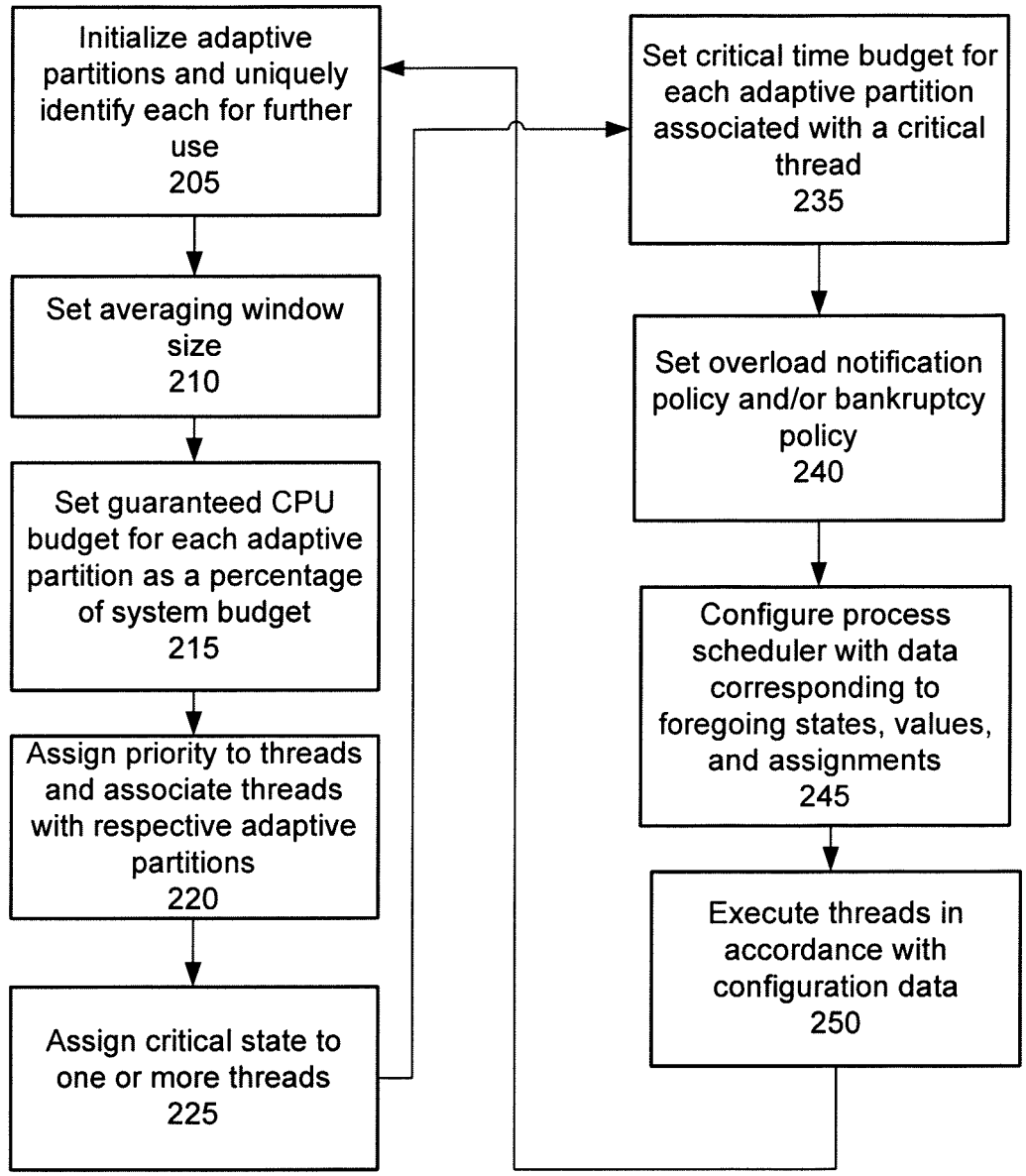
FIG. 2 is a diagram of a process that may be used to set up a process scheduler that employs adaptive partitions.

FIG. 2 shows a process that may implement one of the process scheduler instances 130. Both process scheduler instances 130 and 135 may employ substantially the same process shown in FIG. 2. The flow chart of FIG. 2 illustrates many of the values and operational characteristics used in the process scheduler instances 130 and 135. Some values or operational characteristics may be established through user choices during the design process, while other values or operational characteristics may be programmed through configuration data provided by a user and/or through software programming of the system 100.

The process scheduler instance 130 may create different adaptive partitions at block 205. Each adaptive partition may constitute a virtual container for scheduling attributes associated with a set of process threads that have been grouped together by the process scheduler instance 130. Threads that work toward a common or related function may be assigned to the same adaptive partition. In object-oriented systems, the adaptive partitions may be generated as instances of an adaptive partition class that includes corresponding scheduling methods and attributes. Each of the adaptive partitions generated at block 205 may be uniquely identified for further access by the process scheduler instance 130.

The number of partitions generated by the process scheduler instance 130 may be initiated through the use of configuration parameters. The configuration data may be provided by user initiated commands or through programs that interface with the process scheduler instance 130.

At block 210, the size of an averaging window used by the process scheduler instance 130 is calculated. The averaging window may be the time over which the process scheduler instance 130 attempts to keep adaptive partitions at their guaranteed CPU percentages when the system is overloaded. A time that may be used for the averaging window is about 100 milliseconds, though other averaging window sizes may be appropriate. The averaging window size may be specified at boot time, and may be respecified any time thereafter. Considerations in choosing the size of the averaging window may include:

A short duration averaging window size may reduce the accuracy of CPU time-balancing.

When a short duration averaging window is used, partitions that exhaust their budgets because other partitions are using less than their guaranteed percentage may not have to pay the time back.

In some instances, a long duration averaging window size may cause some adaptive partitions to experience runtime delays.

The size of the averaging window ("windowsize") may be assigned in terms of milliseconds, which the scheduling process 130 converts to clock ticks. A clock tick is the interval between clock interrupts (i.e., the system timer). The time budgets used by the scheduling process instance 130 may be averaged over the same windowsize.

At block 215, the process scheduler instance 130 may assign a guaranteed CPU time budget to each adaptive partition. The guaranteed budget may be assigned as a percentage of the overall available system budget. Even when system 100 employs multiple CPUs 105 and 107, the sum of all adaptive partitions' CPU percentages will be 100%. For the purpose of assigning shares of the overall system CPU time budget, the CPUs in a symmetric multiprocessing system, regardless of the number, may be considered in the same manner as a single CPU.

The guaranteed budget used for each adaptive partition may be determined in a number of different manners. The CPU time used by each partition under several different load conditions may be measured to construct a graph of load versus CPU time consumed by each partition. Measurements may be made under overload conditions. Using this information, a system may balance the needs of the various threads contained in each partition under the various conditions and assign the appropriate guaranteed CPU time budgets. The measurements also may be used to dynamically vary the guaranteed CPU time budgets with respect to CPU load conditions. For example, the process scheduler instance 130 may operate with different operating modes in response to different operating conditions. While operating in a particular mode, the process scheduler instance 130 may employ a unique set of adaptive partition parameters. The availability and parameters associated with a particular mode may be specified at boot time. A application programming interface ("API") at run-time may be used to switch modes as needed.

For example, a first set of guaranteed CPU time percentages may be employed during startup while a second set of guaranteed CPU time percentages may be employed during normal operations after system startup has been completed.

A priority may be assigned to each thread and each thread may be associated with a respective adaptive partition at block 220. Functionally-related software may be assigned to the same adaptive partition. This effects a hybrid process scheduling system in which the priority assigned to a thread as well as the guaranteed CPU time percentages of the adaptive partitions are used in the scheduling decisions executed by the process scheduler instance 130.

In assigning the threads to respective adaptive partitions, adaptive partition scheduling may be structured to decide when the running of a particular function of the system will be inhibited. When structured in this manner, separate threads may be placed in different adaptive partitions based on whether the threads should be starved of CPU time under a predetermined condition. For example, suppose the system 100 operates as a packet router. Some of the processes executed by a packet router may include 1) routing packets; 2) collecting and logging statistics for packet routing; 3) route-topology protocols with peer routers; and 4) collecting logging and route-topology metrics. In such instances, the threads of these processes may be assigned to two adaptive partitions: one for threads associated with routing and one for threads associated with the topology of the network. When the system is overloaded, e.g., there is more outstanding work than the machine may possibly accomplish.

Consequently, there may be a need to determine which applications are to be run slower.

In this application, it may be preferable to route packets as opposed to collecting routing metrics if the CPU does not have enough resources to execute threads for both routing and metrics. It may run the threads associated with network topology protocols, even when CPU resources are limited. Under these circumstances, it may be preferable to employ three adaptive partitions. The three adaptive partitions, along with exemplary guaranteed budgets, may include:

an adaptive partition for routing packets (80% share);
an adaptive partition for topology protocols, (15% share), but with maximum thread priorities higher than the threads in the adaptive partition for routing packets; and
an adaptive partition, (5% share), for logging of both routing metrics and topology-protocol metrics.

In this case, adaptive partition scheduling reorganizes various system functions so that certain functions are given priority during high CPU loads, while ensuring that system functions are given CPU execution time. Threads associated with routing and threads associated with logging routing metrics have been associated with separate adaptive partitions despite the fact that they are functionally related to routing operations. Similarly, two functionally unrelated components, routing metric logging and topology metric logging, have been associated with the same adaptive partition. This manner of assigning the various threads to different partitions enables the process scheduler instance 130 to reduce CPU time usage by the logging threads under high CPU load conditions and give priority to routing threads and topology protocol threads while still conducting metrics logging.

At block 225, a determination may be made as to which threads of the system 100 will be allowed to run in a critical state. Designating a thread as critical gives it the ability to run in a manner that approximates a real-time system, even when the guaranteed budget for the adaptive partition budget might otherwise be exceeded. When a critical thread associated with a particular adaptive partition is run despite the lack of guaranteed budget for the adaptive partition, the adaptive partition may be said to have gone into short-term debt. Critical threads may be associated with the various partitions, for example, at boot time. Depending on system configuration, there may be no critical threads in the system 100.

Each adaptive partition that is associated with a critical thread may be assigned a critical time budget at block 235. The critical time budget may be specified in time units, such as milliseconds. In system 100, the critical time budget is the amount of CPU time available to all critical threads associated with a given adaptive partition above that partition's guaranteed time budget during an averaging window. By employing critical designations and critical time budgets, a critical thread generally has an opportunity to run on the CPU even if its associated adaptive partition has exhausted its guaranteed budget. This will occur as long as the partition still has critical time budget available. Critical threads may provide the ability for real-time behavior within these partitions.

Various policies that the process scheduler instance 130 follows may be optionally assigned to the system 100 at block 240. For example, a bankruptcy policy may be applied to one or more of the adaptive partitions to determine how the system 100 and/or process scheduler instance 130 handles a bankrupt state of an adaptive partition. Bankruptcy of a critical adaptive partition occurs when the adaptive partition has exhausted both its guaranteed CPU time budget and critical time budget over the duration of the averaging window. As a further example, system 100 may execute an overload notification policy that allows a process to register with the process scheduler instance 130 so that it is notified when a system overload occurs. A system overload may occur, for example, when all of the ready threads cannot be executed on the CPU over the duration of the averaging window. A process may register to be informed of an overload condition when the system 100 enters and/or leaves the overload state. Applications may use this overload notification to gracefully degrade their service, for example, by skipping less important functions, or by reducing the precision of computation.

Adaptive partitions may be allowed to go over budget when some other adaptive partition is sleeping. This is not by itself necessarily considered to be a system overload, and therefore does not require triggering of the overload-notification policy.

At block 245, the process scheduler instance 130 is configured with data corresponding to the foregoing states, values and/or assignments provided at blocks 205 through 240. These states, values and/or assignments may be provided for use in the system 100 in a number of different manners, such as, by the system designer, by the system user, through other software programs, etc.

Block 250 represents execution of the threads in accordance with the configuration data of block 245. The attributes of the various adaptive partitions may be dynamic. The parameters set forth in one or more of the foregoing blocks may be changed in response to system requirements, system state, changes in system functions, etc., as represented by the flowline returning to block 205.

The threads in system 100 also may vary dynamically over time. For example, a thread or group of threads associated with an adaptive partition may spawn, or generate, other threads during operation. The originating thread may be referred to as a parent thread while a spawned thread may be referred to as a child thread. Process scheduler instance 130 may be configured so that child threads inherit the adaptive partition of their parent thread automatically. Alternatively, or in addition, an API may be provided that will allow spawning threads into other adaptive partitions. Such an API may be made available only to code with sufficient privilege. For example, a system application launcher may have such privileges.

Figure 3:
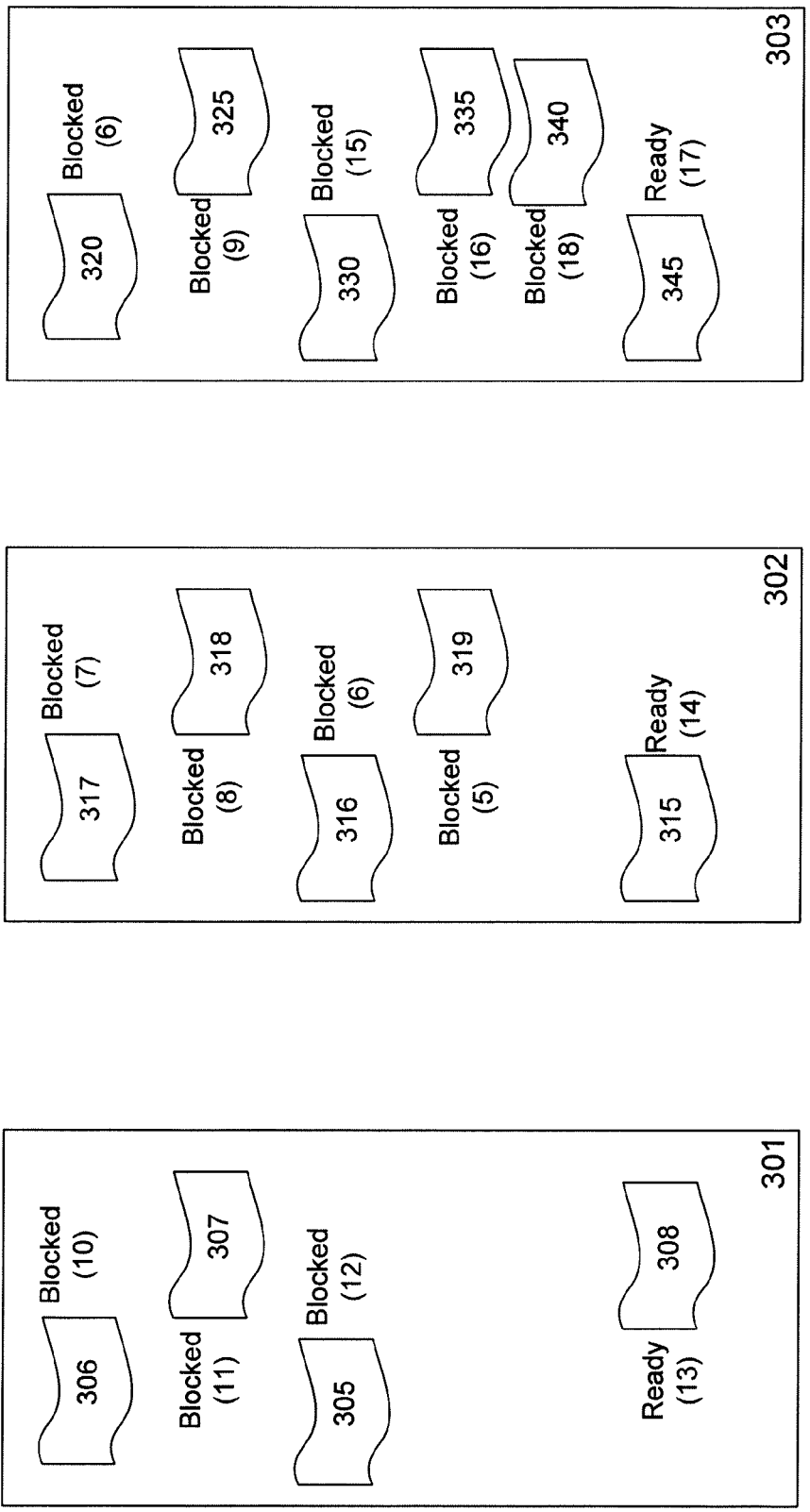
FIG. 3 is a diagram of an arrangement of adaptive partitions and threads that may be associated with an instance of an adaptive partition process scheduler.

FIG. 3 illustrates how the process scheduler instance 130 may operate under normal load conditions in which none of the partitions exceeds its CPU budget. In FIG. 3, the process scheduler instance 130 has generated three adaptive partitions 301, 302 and 303. Adaptive partition 301 may be associated with the threads 305, 306, 307, and 308, of a multimedia application. Adaptive partition 302 may be associated with the threads 315, 316, 317, 318, and 319 of a Java application. Adaptive partition 303 may be associated with the threads 320, 325, 330, 335, and 340 of a system logging application. The threads 305-345 have various scheduling priorities, denoted in parentheses in FIG. 3, that may be independent of the guaranteed budget of the associated adaptive partition.

Each adaptive partition 301-303 and thread 305-345 may assume different operative states. Adaptive partitions 301-303, for example, may operate in an active state or a sleep state. In the active state, the scheduling attributes of the adaptive partition may be used to schedule CPU time for the associated threads. A sleep state may occur when there are no ready threads associated with the adaptive partition. In such instances, the process scheduler instance 130 may effectively treat the adaptive partition as non-existent.

Threads may assume, for example, a running state, a ready state or a blocked state. A thread is in the running state while it is being executed by a CPU. It is in a ready state when a set of conditions have been met that render the thread fully prepared for execution by a CPU at a time determined by the process scheduler instance 130. A thread is in the blocked state while the thread waits for the occurrence of one or more events. While in the blocked state, the thread is not ready to consume any CPU resources. Once the events awaited by the thread occur, the thread may become unblocked and enter the ready or running state.

The adaptive partitions 301-303 and corresponding threads 305-345 can be used to describe the operation of the process scheduler instance 130 during various load conditions. In this example, the process scheduler instance 130 makes the CPU 105 available to execute ready threads 308, 315, and 345 assigned to each adaptive partition 301, 302, and 303, based on the priority of the ready threads. Under normal load conditions, the highest-priority thread associated with CPU 105 may run when it becomes ready. Whether a thread is ready may be indicated to the process scheduler instance 130 in a number of different manners including, for example, through the occurrence of an interrupt event. In the illustrated example, the highest priority ready thread is thread 345, which has a priority of 17. Thread 345 will continue to operate in a running state until it is finished, blocked, or until the budget for adaptive partition 303 is exhausted. Under heavy load, if an adaptive partition exceeds its CPU budget, then its highest-priority thread does not run until the partition once again has time available in its CPU budget. This is a safeguard on the system 100 that divides insufficient CPU time among the partitions 301, 302, and 303. In this state, the processor runs the highest-priority thread in an adaptive partition with CPU time remaining in its guaranteed CPU time budget.

When an adaptive partition enters a sleep state, the process scheduler instance 130 may allocate the CPU budget of the sleeping partition to other active adaptive partitions, even if the other active adaptive partitions have exceeded their budget. For example, if adaptive partition 303 enters a sleep state, the process scheduler instance 130 may allocate the budget for adaptive partition 303 to adaptive partition 302, since adaptive partition 302 has the highest priority ready thread 315. If two or more adaptive partitions have threads with the same highest priority, the process scheduler instance 130 may divide the free time in proportion to the other adaptive partitions' percentages. This allocation may assist in preventing long ready-queue delay times in the case where two adaptive partitions have the same priority.

Figure 4:
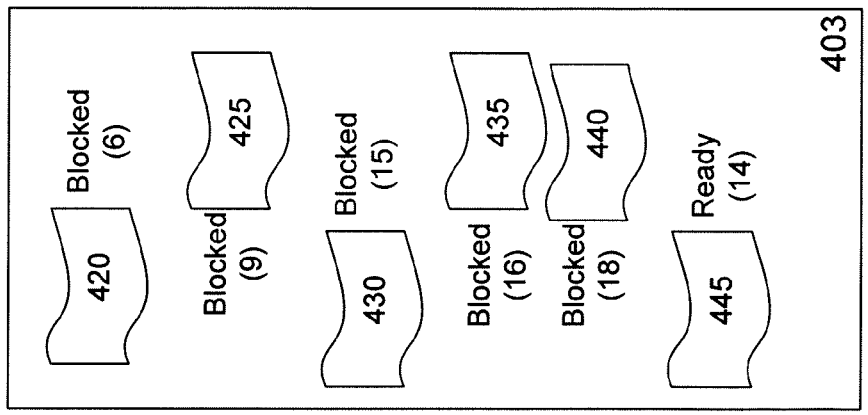
FIG. 4 is a diagram of a further arrangement of threads and adaptive partitions associated with an instance of an adaptive partition process scheduler.
Figure 4:
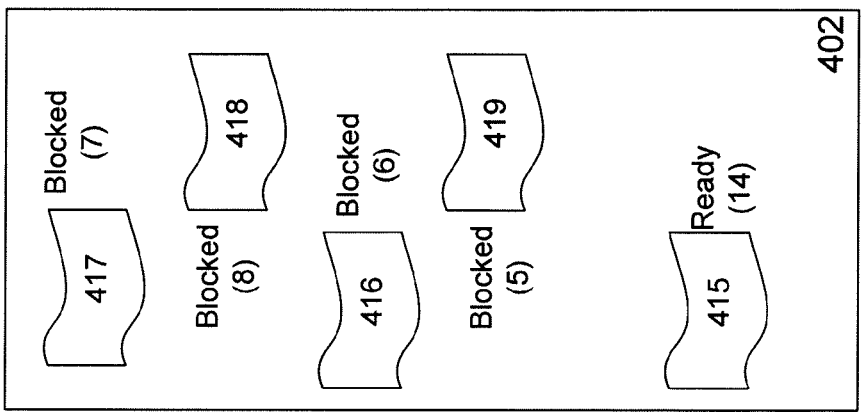
Figure 4:
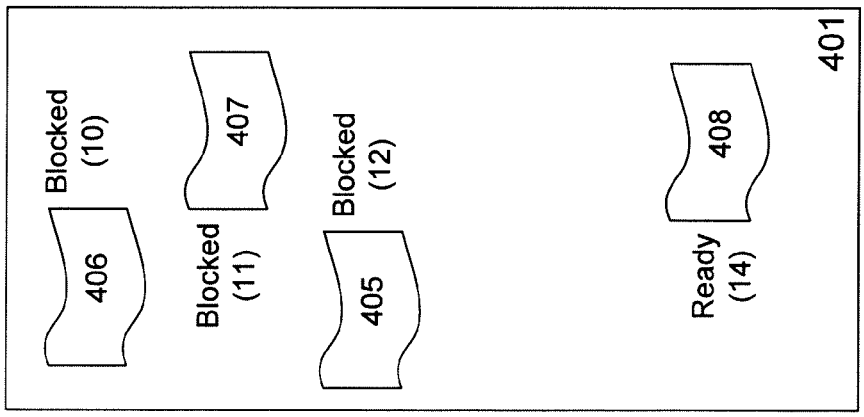

In FIG. 4, there are three adaptive partitions 401, 402, and 403, with 70%, 20% and 10% CPU budget guarantees, respectively. Further, each adaptive partition 401, 402, and 403, includes a respective ready thread 408, 415, and 445, having a priority of 14. If adaptive partition 401 enters a sleep state through a blocking of thread 408, the process scheduler instance 130 may allocate all of the available CPU time to adaptive partitions 402 and 403 in a 2:1 ratio, the ratio corresponding to their original CPU budget allocations. If adaptive partition 401 is in a sleep state for a short time, then the process scheduler instance 130 may ensure that partition 401 later receives CPU time at its guaranteed CPU time budget by reallocating the CPU resources so that adaptive partitions 402 and 403 pay back the CPU time that each utilized at the expense of partition 401. If adaptive partition 401 is in a sleep state for a long time, then some or all of the time used by adaptive partitions 402 and 403 may become free. Whether an adaptive partition is in a sleep state for a short time or a long time can be determined in various manners. For example, an adaptive partition can be said to be in a sleep state for a short time when it is in the sleep state for a duration of time that is less than (windowsize)—(budget percentage*windowsize) milliseconds within one averaging window.

If all adaptive partitions are at their CPU budget limits, then the process scheduler instance 130 may specify running of the highest-priority thread associated with CPU 105. If two adaptive partitions have threads with the same highest priority, then the adaptive partition that has used the smallest fraction of its budget may be run. This manner of operation may be used to prevent long ready-queue delays that may otherwise occur. In FIG. 4, the window size may be 100 ms, adaptive partition 401 is allotted 70% of the CPU budget and has used 40 ms, adaptive partition 402 is allotted 20% of the CPU budget and has used 5 ms, and adaptive partition 403 is allotted 10% of the CPU budget and has used 7 ms. All partitions have a ready thread at priority 14. In this situation, thread 415 of adaptive partition 402 may be run because its relative fraction free is 5 ms/20 ms, or 0.25, while the relative fraction free for adaptive partition 401 is 40 ms/70 ms or 0.57 and 7 ms/10 ms or 0.70 for adaptive partition 403.

If an adaptive partition has exhausted the assigned CPU budget and one or more of its ready threads are designated as critical, then the process scheduler instance 130 may allow the adaptive partition to use its critical CPU budget to run the critical threads. The critical time budget is the amount of CPU time that the process scheduler instance 130 allocates to an adaptive partition to run all critical threads associated with the adaptive partition. This critical time budget constitutes CPU time that the process scheduler instance 130 allocates to the adaptive partition the partition's normal budget during an averaging window. A critical thread may run even if the adaptive partition with which it is associated is out of budget, as long as the adaptive partition has not exhausted its critical time budget.

Figure 5:
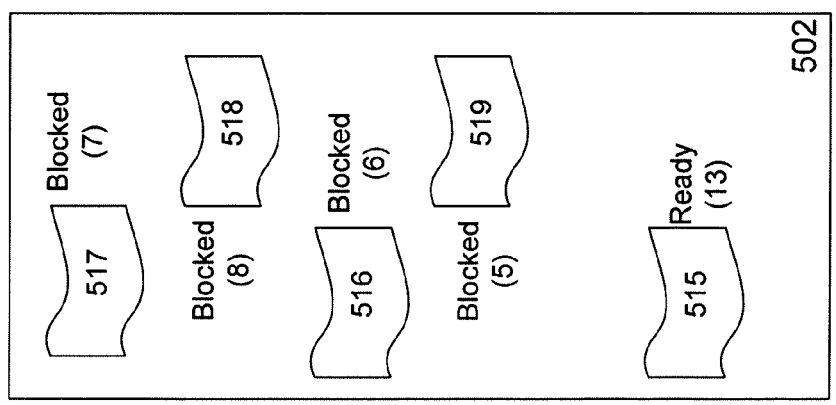
FIG. 5 is a diagram of an arrangement of adaptive partitions and corresponding threads, where at least one of the ready threads has been designated as a critical thread.
Figure 5:
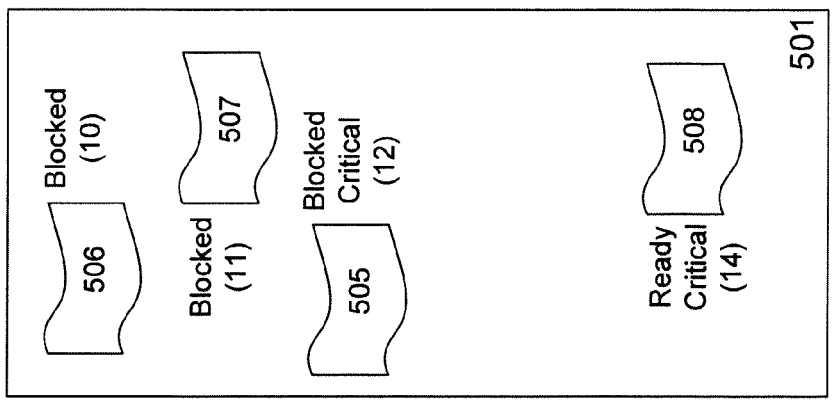

FIG. 5 illustrates a system having two adaptive partitions 501 and 502. Threads 505, 506, 507, and 508 are associated with adaptive partition 501, while threads 515, 516, 517, 518, and 519 are associated with adaptive partition 502. Adaptive partition 501 may comprise threads that are associated with, for example, an airbag notification process. Threads 505 and 508 of adaptive partition 501 have been designated as critical threads. However, only thread 508 is in a ready state.

In this example, adaptive partition 501 has exhausted its guaranteed CPU time budget. Nonetheless, critical thread 508 may be allowed to run because of the importance that has been placed on it through the critical designation. Consequently, the process scheduler instance 130 may allocate CPU time to critical thread 508 provided there is still CPU time in the critical time budget of adaptive partition 501.

When the process scheduler instance 130 schedules the running of a critical thread, such as thread 508, the process scheduler instance 130 bills the thread's run time against the available guaranteed CPU time budget of the thread's associated adaptive partition. However, the process scheduler instance 130 may debit the CPU time used by the critical thread against the critical time budget of the adaptive partition only if the process scheduler instance 130 would not have otherwise run the critical thread. CPU time used in running a critical thread need not counted against the critical time budget of the associated adaptive partition when 1) the system is not overloaded, or 2) the system is overloaded, but one or more adaptive partitions may not be exhausting their guaranteed CPU time budgets.

A critical thread may remain in a critical running state until it enters a blocking state. That is, it may leave the running or ready state as is the case with any other thread. This may occur while the thread is waiting for a message, interrupt notification, etc. The criticality of a thread, or billing to its adaptive partition's critical time budget, may be inherited along with the adaptive partition during operations which trigger priority inheritance.

The short-term debt may be bounded by the critical time budget specified for the partition. Over time, the partition may be required to repay short-term debt. A critical thread that exceeds the critical time budget of the adaptive partition may be considered to drive the associated adaptive partition into bankruptcy. Bankruptcy may be handled as an application error, and the designer may specify the system's response. Exemplary choices for a response include: 1) forcing the system to reboot; 2) notifying an internal or external system watchdog; and/or 3) terminating and/or notifying other designated processes. The system may add an entry to a log or the like if an adaptive partition exhausts its critical time budget. When the budgets for the adaptive partitions are dynamically altered (through, for example, a mode change, an API call to modify CPU percentages, or the like), the process scheduler instance 130 may impose a delay before testing an adaptive partition for bankruptcy. This allows the budgets to stabilize before an adaptive partition may be declared bankrupt.

The system may also respond to bankruptcy of a partition by revoking the offending partition's critical budget. This may be accomplished by setting the critical budget for the offending partition 20. In this manner, the partition is not allowed to run as a critical partition again until, for example, the next restart or API reconfiguration.

The designation of a thread as critical may occur in a number of different manners. For example, the system may automatically mark threads that are initiated by an I/O interrupt as critical. The system also may specify a set of additional applications or operating system notification events, for example, timers, which may mark their associated handler threads as critical. An API also may be used to mark selected threads as critical. Still further, child threads of critical parent threads may be automatically designated as critical.

Figure 6:
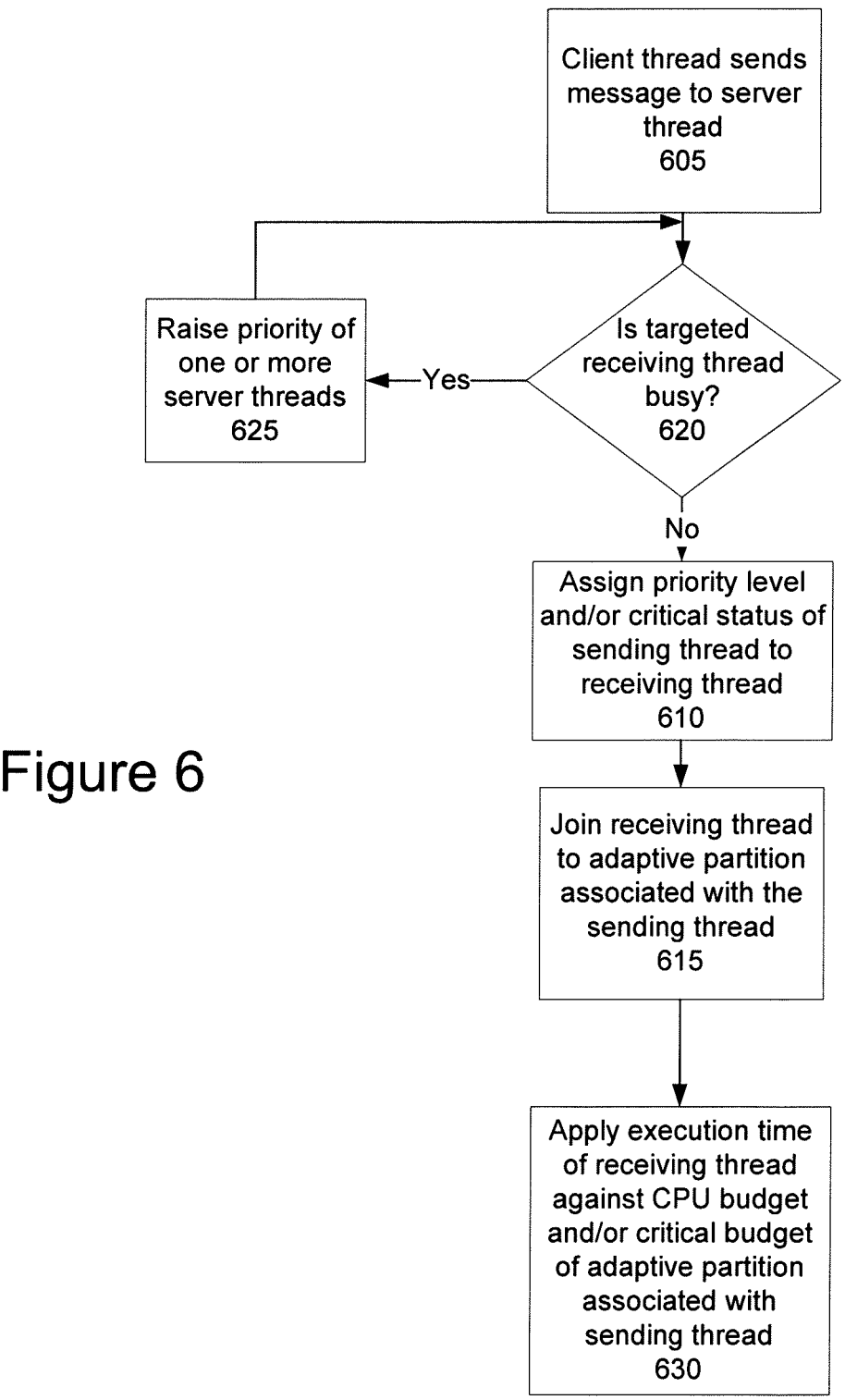
FIG. 6 is a diagram showing a process for implementing an adaptive partition process scheduler in an environment in which there are sending threads and receiving threads.

The process scheduler instance 130 also may be adapted for use in client/server systems in which messages are passed from one or more sending/client threads for receipt and/or processing by one or more receiving/server threads. FIG. 6 shows a process in process scheduler instance 130 in a client/server environment. At block 605, a client thread in a first adaptive partition sends a message to a server thread in a second adaptive partition. When a client thread sends a message to a server thread, the server thread that receives the message may inherit the priority of the sending thread. This acquisition may assist in preventing priority inversion, since the server thread is doing work on behalf of the sending client. The acquisition (e.g., inheritance) of the priority level of the sending thread by the server thread is shown at block 610. The process scheduler instance 130 may assign the same critical status or characteristic of the client thread to the server thread at block 610. At block 615, the process scheduler instance 130 may associate the server thread with the same adaptive partition that is associated with the client thread.

Figure 7:
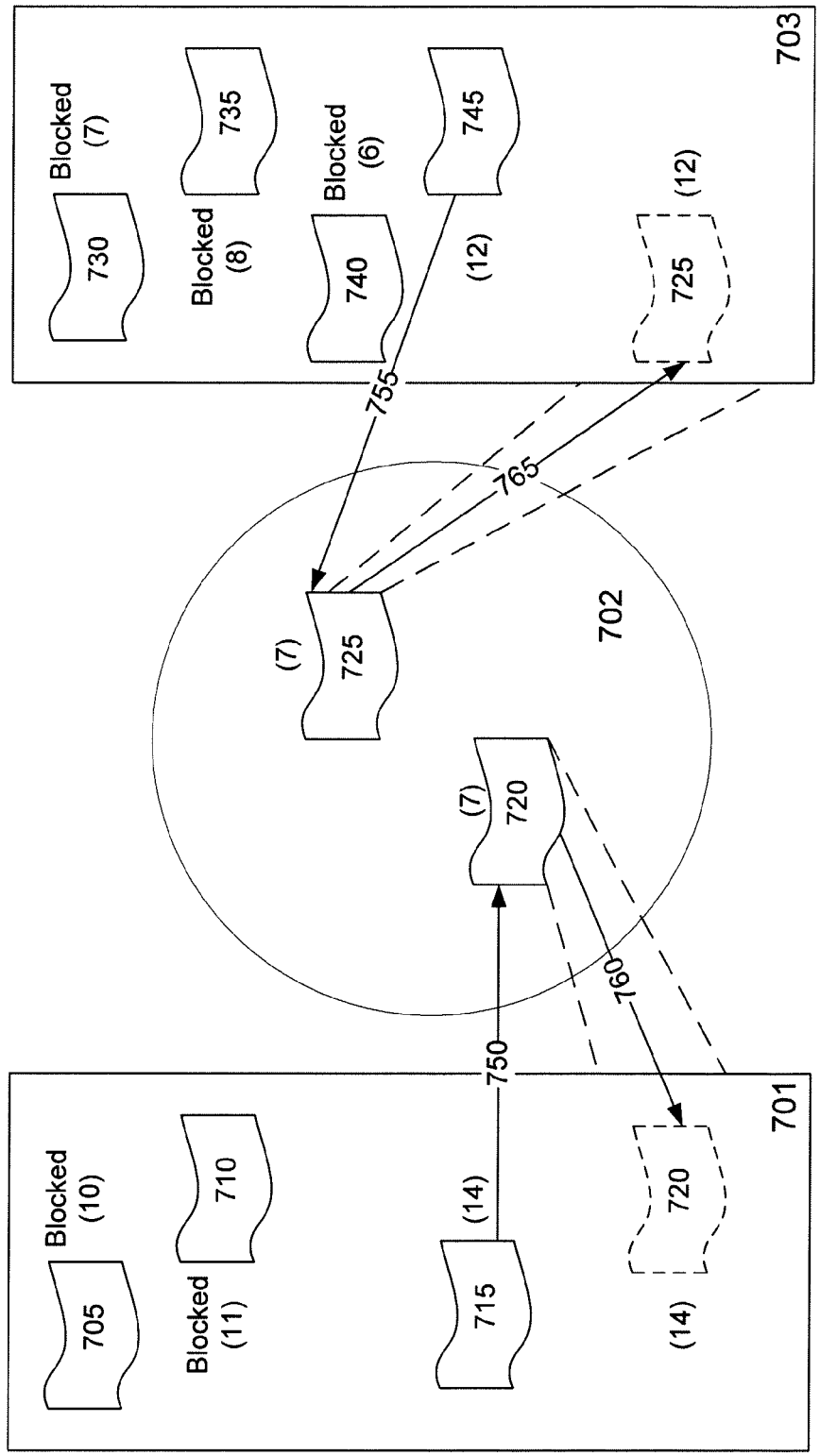
FIG. 7 is a diagram illustrating the operation of the adaptive partitioning process scheduler described in FIG. 6.

FIG. 7 illustrates an organization of adaptive partitions that may explain some aspects of the operations shown in FIG. 6. In this system, there are three adaptive partitions 701, 702, and 703. Adaptive partition 702 may include server threads 720 and 725 of the type run, for example, by the processes of a file system. The attributes assigned to adaptive partition 702 may vary with the design of the system. However, in FIG. 7, adaptive partition 702 has been generated with a CPU time budget of zero, and threads 720 and 725 have been assigned a default priority of 7. Adaptive partition 701 may comprise a number of different threads 705, 710, and 715, where thread 715 constitutes a client thread that sends messages to one or more server threads of adaptive partition 702. Similarly, adaptive partition 703 may comprise a number of different threads 730, 735, 740, and 745, where thread 745 constitutes a client thread that sends messages to one or more server threads of adaptive partition 702.

As shown by line 750 of FIG. 7, client thread 715 has passed a message that is received or otherwise processed by thread 720 of adaptive partition 702. Client thread 745 of adaptive partition 703 has passed a message that is received or otherwise processed by thread 725 of adaptive partition 702, as indicated by line 755. When the message transfers 750 and 755 occur, the process scheduler instance 130 associates each server/receiving with the adaptive partition of the thread that sent the message. In this case, server thread 720 is temporarily associated with adaptive partition 701, as indicated by line 760, and is assigned the same priority, 14, as thread 715. Likewise, server thread 725 is temporarily associated with adaptive partition 703, as indicated by line 765, and is assigned to the same priority, 12, as thread 745. Both threads 720 and 725 may be placed in a ready state, while threads 715 and 745 may be placed in a blocked state as the respective messages are processed. Once thread 720 has completed processing the message received from thread 715, thread 720 may return to its original state where it is associated with adaptive partition 702 with a default priority of 7. Also, thread 725 may return to its original state where it is associated with adaptive partition 702 with a default priority of 7 once it has completed processing of the message received from thread 745.

Sometimes, a client thread may attempt to communicate with a server thread that is busy processing one or more messages that have been previously received from other client threads. For example, if thread 740 of adaptive partition 703 becomes unblocked and attempts to send a message to server thread 725 while server thread 725 is busy processing one or more prior messages received from thread 745, server thread 725 may be unable to respond to thread 740 until it has completed processing the prior messages from client thread 745. The process scheduler instance 130 may temporarily raise the priorities of one or more server threads that, for example, wait on the same connection path as the client thread. The query and action corresponding to these operations are illustrated at blocks 620 and 625 of FIG. 6. In the system shown in FIG. 7, the priority of server thread 725 may be raised in an attempt to reduce the latency that may otherwise occur before server thread 725 is available to process the message from client thread 740. Depending on the nature of the threads in adaptive partition 702, the priority levels of multiple server threads may be raised.

At block 630 of FIG. 6, the process scheduler instance 130 may bill the execution time for each thread 720 and 725. The billing of the execution time may vary. One manner includes applying the execution time of the receiving thread against the CPU budget and/or critical CPU budget of the adaptive partition associated with the sending thread. In FIG. 7, the execution time used by thread 720 in responding to a message sent by thread 715 is counted against the CPU budget and/or critical CPU budget of adaptive partition 701. The execution time used by thread 725 in responding to a message sent by thread 745 may be counted against the CPU budget and/or critical CPU budget of adaptive partition 703.

System components, such as filesystems, device drivers, and the like may be assigned a guaranteed budget of zero. The CPU time used by the threads associated with the system component may be billed to their clients. Sometimes the process scheduler instance 130 may determine which threads a particular system component thread has been ultimately working for too late. As a result, the process scheduler instance 130 may not bill the running of the threads of the system components in a timely manner and/or to the proper adaptive partition. Additionally, some system components, such as device drivers, may have background threads (e.g. for audits or maintenance) that require budgets that cannot be attributed to a particular client. In those cases, the system designer may measure the background operations and unattributable loads associated with the various system components. The resulting measurements may be used to provide non-zero budgets to the adaptive partitions associated with the threads of the various system components.

The process scheduler instance 130 may do more than simply direct the running of the highest priority ready thread associated with an adaptive partition having guaranteed CPU time left in its budget. For example, when all adaptive partitions have exhausted their guaranteed CPU time budgets at approximately the same time, then the process scheduler instance 130 may direct the running of the highest priority thread in the system irrespective of the attributes of the associated adaptive partition. Also, when adaptive partitions have threads of the equal highest priorities, the process scheduler instance 130 may assign CPU time using the ratio of their guaranteed CPU time percentages. Critical threads may be run even if their adaptive partition is out of budget, provided the adaptive partition still possesses an amount of its critical time budget. Billing of CPU time to each of the adaptive partitions in a system may take place in a number of different manners and may occur many times during the operation of the process scheduler instance 130. For example, billing of an adaptive partition may occur whenever 1) a thread starts running from a blocked state, 2) a thread stops running (e.g., when it has been preempted by a higher priority thread, when it has been blocked, or the like), 3) at other times when an accurate accounting of the CPU time is needed by the process scheduler instance 130, and/or when the running of a thread in a multiprocessor system is transferred from one central processing unit to another central processing unit.

Process schedulers may use standard timer interrupts, or ticks, to determine how long a thread has used the CPU. Tick periods may be on the order of one to several milliseconds.

The process scheduler instance 130, however, may include code that effectively microbills the execution time of the various threads of the system. To this end, a high-resolution hardware and/or software counter having a period substantially less than the tick periods may be used. Each time a thread starts or stops running, the process scheduler instance 130 assigns a timestamp to the associated partition corresponding to the value of the high-resolution counter. The timestamp values may be scaled to a useful common time unit. The differences between the timestamps for adjacent start and stop times of a thread are used to microbill the appropriate adaptive partition.

The high-resolution counter may be implemented in a number of different manners. For example, some CPUs have a built-in counter that increments at about the clock frequency at which the CPU is run. In such situations, the built-in counter may be used in the microbilling process. In another example, a high-resolution counter may be simulated using software by querying an intermediate state of a programmable count-down timer that, for example, may normally be used to trigger clock interrupts. This may be the same counter used to provide an indication that a tick interval has occurred. In such situations, the timestamps should take into consideration both the counter value and the number of ticks that have occurred from a given reference point in time so that the timestamps accurately reflect the start times and stop times of the individual threads.

In a multiprocessing system, a global micro-billing counter need not be employed and the counters of the individual central processing units need not be synchronized. Separate, free-running counters on each central processing unit may be used. The counters need not be synchronized, but may increase at the same rate. In such instances, virtual synchronization may be employed. Such a virtual synchronization may occur during initialization of the process scheduler instance. During this initialization, the values of all the counters of the system may be rapidly sampled. The sampling may occur during a short time compared to the accuracy used by the process scheduler and since (e.g., less than 0.001 of a tick). The relative differences between the counters are saved as offsets. When a partition is microbilled, a comparison of the counter of one central processing unit may be compared to the counter of another central processing unit by adjusting any counter calculations using the save to offsets.

System 100 may be configured as a symmetric multiprocessing system. In a symmetric multiprocessing system, the underlying hardware topology is hidden from the application code. As such, applications may migrate to machines with ever-increasing numbers of CPUs. Adaptive partition scheduling may consider a symmetric multiprocessing system to have a global 100% CPU budget irrespective of the number of CPUs used in the system. An adaptive partition scheduling system may consider the system 100 to have 100% of the system's CPU budget, where each CPU 105 and 107 has 50% of the overall 100% system budget.

A bound multiprocessing system is a type of symmetric multiprocessing system. In a bound multiprocessing system, runmasks may be used to 1) lock a thread to a particular CPU in the system, 2) lock a thread to a subset of CPUs, 3) allow a thread to run on any CPU in the system, 4) and/or any combination of these situations. Threads may be bound to execution by a particular CPU to prevent threads from swapping between CPUs, which can cause a loss of cache heating on those machines which have separate caches for each CPU. Other reasons for binding threads to execution by a particular CPU also exist.

Bound multiprocessing systems may employ adaptive partition scheduling in substantially the same manner as a symmetric multiprocessing system. When adaptive partition scheduling is used in a bound multiprocessing system, an instance of the process scheduler may be executed by each CPU. Each process scheduler instance may employ a merit function for each of the adaptive partitions run on the CPU to schedule the execution of threads on the CPU. The merit function, Merit(p,c), for a particular partition, p, on CPU, c, may be based, at least in part, on whether the adaptive partition has available budget on the particular CPU. Alternatively, or in addition, the merit function, Merit(p,c), may be based, at least in part, on whether the adaptive partition has remaining budget globally amongst all of the CPUs of the system. Other parameters may also be used in connection with the merit function, Merit(p,c).

The merit function Merit(p,c) may be determined in a number of different manners. One merit function Merit(p,c), may comprise:

MERIT(p,c)=(HAS_BUDGET_ON_ONE_CPU(p,c),

HAS_BUDGET_GLOBALY(p), PRIORITY(p), RFF (p)).

This merit function includes a tuple of 4 terms (a,b,c,d). MERIT(p, c) function values may be ordered by the process scheduler instance according to rules for comparing tuples.

If m1=MERIT(p1,c1)=(a1,b1,c1,d1) and m2=MERIT(p2, c1)=(a2,b2,c2,d2), then m1>m2 when any of these are true:
a1>a2
a1=a2, but b1>b2
a1=a2 and b1=b2, but c1>c2
a1=a2 and b1=b2 and c1=c2, but d1>d2

The MERIT(p,c) function may use a number of helper functions and configuration parameters. These helper functions may include:

IS_CRITICAL(p) is a boolean function that may return a value of "TRUE" when both of these conditions are true:
1. the highest-priority ready-to-run thread in parition, p, is marked critical; and
2. the number of ticks billed to the critical budget of partition, p, during the averaging window is less than or equal to that partition's critical budget.

GLOBAL_BUDGET_IN_TICKS(p) is the budget of partition, p, and maybe expressed in ticks. For a 2 CPU system such as the one shown in FIG. 1, with a 100 ms averaging window, and a budget of 40%, this value may be 80 ticks.

BUDGET_ON_ONE_CPU_TICKS(p,c) is the portion of parition p's budget that applies to one CPU, c. So for a 2 CPU system, with a 100 ms averaging window, and a budget of 40%, this would be 40 ticks.

TICKS_USED_GLOBALLY(p) is a function that may return a real number of CPU ticks that partition, p, has used during the current averaging window. When microbilling is employed, this parameter may be measured to about 0.001 tick resolution.

TICKS_USED_ON_CPU(p,c) is a function that may return a real number of ticks used by partition, p, on CPU, c, during the current averaging window. When microbilling is employed, this parameter may be measured to about 0.001 tick resolution. The sum of TICKS_USED_ON_CPU(p,c) for all CPUs may be equal to TICKS_USED_GLBOALLY(p).

These helper functions may be used to determine the four terms of the merit function, MERIT(p,c). The terms of the merit function for each partition, p, may be calculated by the particular instance of the adaptive partition scheduler run on a given CPU, c, in the following manner:

HAS_BUDGET_ON_CPU(p,c) may be a boolean function that may return "TRUE" when (IS_CRITICAL(p) OR TICKS_USED_ON_CPU(p, c)<=BUDGET_ON_ONE_CPU_TICKS(p)). The value of c corresponds to the CPU that the instance of the adaptive partitioning process scheduler is currently running on;

HAS_BUDGET_GLOBALLY(p) may be a boolean function that may return "TRUE" when (IS_CRITICAL(p) OR TICKS_USED_GLOBALLY(p)<=GLOBAL_BUDGET_IN_TICKS(p));

PRIORITY(p) is a function that may return an integer corresponding to the numerical priority of the thread which has the highest priority of all ready-to-run threads in partition, p; and RFF(p) is a function that may return a real value ("relative fraction free"), where RFF(P)=1.0—(TICK_USED_GLOBALLY(p)/GLOBAL_BUDGET_IN_TICKS).

Functions like TICKS_USED_GLOBALLY(p) may be precise only at clock interrupts when the averaging window is advanced only on tick interrupts. However, the adaptive partitioning scheduler may be called upon to pick a thread to schedule between tick interrupts. This may happen, for example, when one thread messages to another, or a thread blocks for an event. The adaptive partitioning scheduler instance may estimate the values of TICKS_USED_GLOBALLY(P) and TICKS_USED_ON_CPU(p) based on the CPU time partition, p, is likely to use during the remainder of current tick interval. The instance of the adaptive partition scheduler may then evaluate the merit function, Merit(p, c), as a prediction of its likely value at the next tick and may use that as the basis for picking a thread to currently run. The estimates of the time that may be used by a partition, p, during the remainder of the current tick interval may be obtained by looking at the number of threads running in parititon, p, on the various CPUs. The amount of time partition, p, is predicted to use in the remainder of a tick may be determined by tracking a prebill amount for each combination of partition and CPU.

Figure 8:
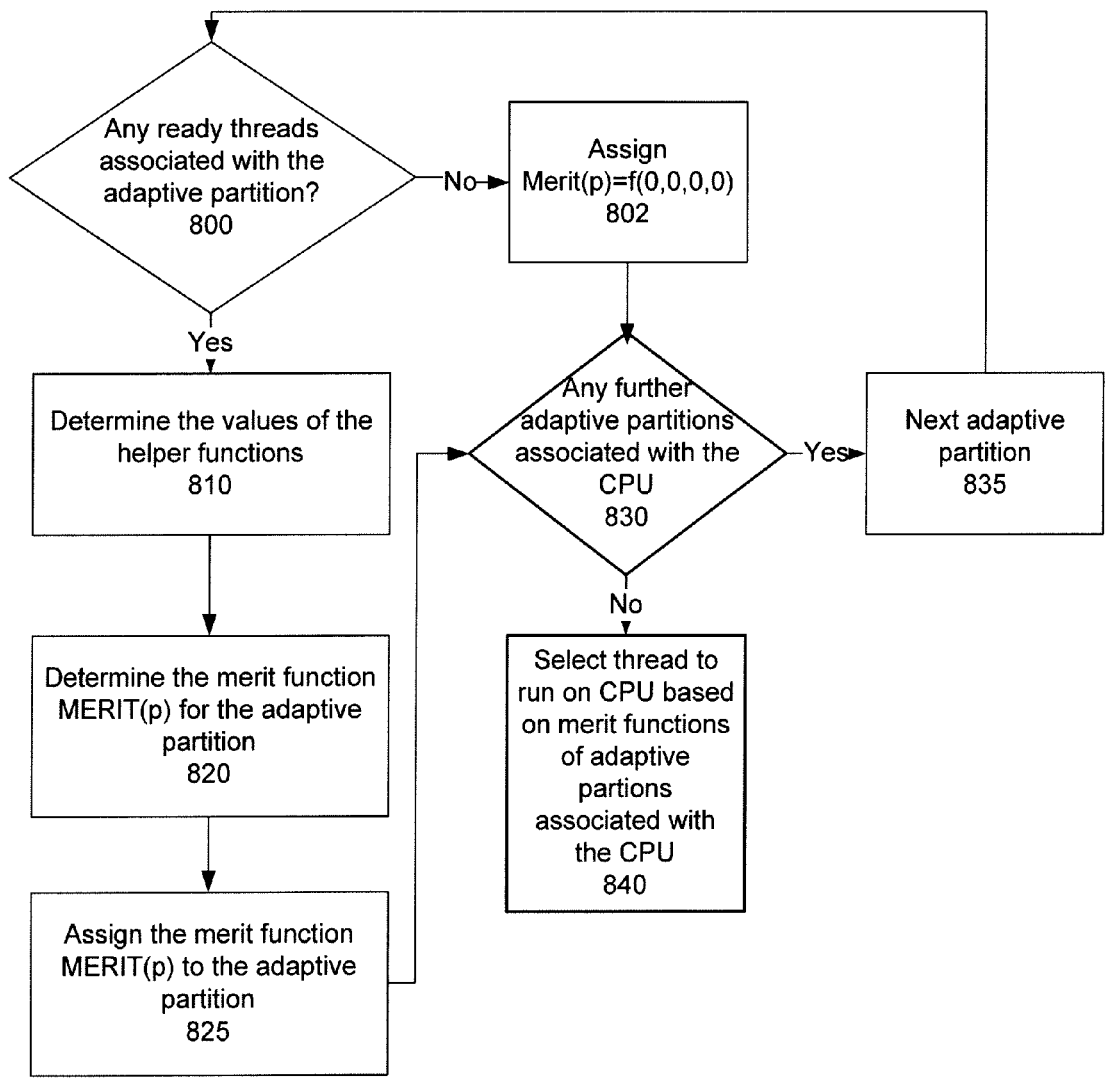
FIG. 8 is a diagram of a process for scheduling the running of threads associated with various adaptive partitions.

Use of a merit function, Merit(p,c), is shown in FIG. 8. The illustrated operations may be executed for each adaptive partition, p, used in the system 100. The process scheduler instance 130 may determine whether the partition has any threads that are ready to run at block 800. If there are no ready threads associated with the adaptive partition, p, the merit function, Merit(p,c), for the adaptive partition may be assigned the values Merit(0,0,0,0), at block 802. If the adaptive partition has a ready thread, the values of the helper functions are determined at 810. At 820, the merit function, Merit(p), for the partition is determined using the helper functions. The resulting values are assigned to the merit function, Merit(p,c), of the adaptive partition at 825. A check is made at 830 to determine whether any further adaptive partitions are associated with the CPU. If there are further adaptive partitions associated with the CPU, the next adaptive partition associated with the CPU is selected at 835 and control may return to 800. Otherwise, the adaptive partition scheduler instance may select the thread to run on the CPU at 840 based on the merit functions of the adaptive partitions running on the CPU. The selection may be based on a comparison of the ordered tuplets of the merit functions, Merit(p, c),of the adaptive partitions.

The process scheduler instance 130 may be used in systems that employ mutexes. Mutexes are used to prevent data inconsistencies due to race conditions. A race condition often occurs when two or more threads need to perform operations on the same memory area, but the results of computations depend on the order in which these operations are performed. Mutexes may be used for serializing shared resources. Anytime a global resource is accessed by more than one thread the resource may have a mutex associated with it. One may apply a mutex to protect a segment of memory ("critical region") from other threads. The application gives a mutex to threads in the order that they are requested. However, the process scheduler instance 130 may be adapted to deal with the problems that occur when a low-priority thread, which may hold the mutex, unreasonably delays access to higher-priority threads that are waiting for the same mutex.

Figure 9:
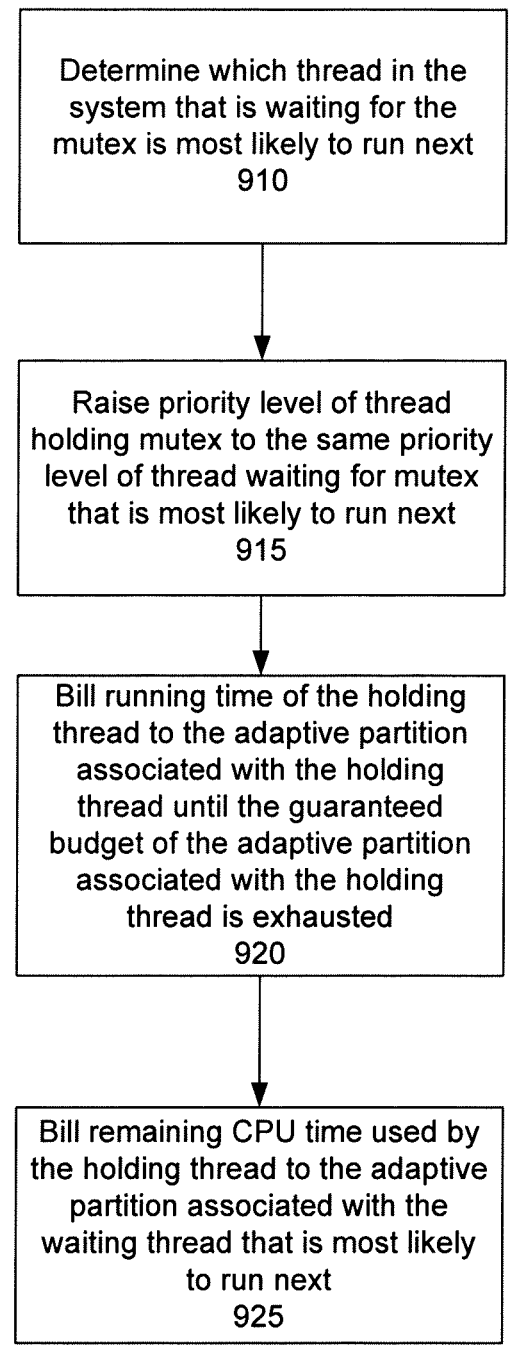
FIG. 9 is a diagram of a process used to schedule the running of threads that access the same mutexes.

FIG. 9 is a process for prioritizing access to a mutex in an adaptive partitioning system, when one thread may hold a mutex, and several other threads may be waiting for the same mutex. When the partition associated with the thread holding the mutex runs out of guaranteed CPU time budget, the process scheduler instance 130 may begin billing the run time of the thread holding the mutex to the partition of the thread waiting for the mutex which, of all the threads waiting for the mutex, is most likely to run next. The process scheduler instance 130 also may begin billing the run time of any thread deemed to be working on behalf of the thread holding the mutex to the adaptive partition associated with the thread holding the mutex. A determination is made at block 910 to identify the thread that is most likely to run next (i.e., the thread that will run after the thread holding the mutex is blocked, finishes, or the like). The waiting thread, which may be waiting for the same mutex as the current thread holding the mutex, may be determined to be "most likely to run next". At block 915, the process scheduler instance 130 may raise the priority level of the thread holding the mutex to the priority of the waiting thread which is most likely, of all the waiting threads, to run next. The process scheduler instance 130 may bill the adaptive partition associated with the current thread holding the mutex for its running time while holding the mutex until the adaptive partition's CPU budget is exhausted (reaches zero) at block 920. At block 925, the remaining CPU time used by the holding thread is billed to the adaptive partition that is associated with the waiting thread that is most likely to run next.

The thread "most likely to run next" may be computed by applying, pairwise, a "compare two threads" process repeatedly on pairs of threads in a list of waiting threads. The "compare two threads" process may be executed as follows, where A and B are the two threads to be compared: The merit function, Merit(p) may be constructed to include the ordered values (HAS_BUDGET_ON_CPU(p,c), HAS_BUDGET_GLOBALY(p), PRIORITY(p), RFF(P) ). Then, let Merit(X, c) correspond to the merit function of the partition containing the thread X run on CPU, c, and Merit(Y,c) correspond to the merit function of the partition run on CPU, c, containing the thread Y. If Merit(X,c)>Merit(Y,c), as determined by a comparison of their tuples, thread X is more likely to run than thread Y. The merit function Merit(p.c) is constructed for each thread in a partition associated with the CPU in which the adaptive partition scheduler is running. The merit functions may be compared until the thread with the highest merit function Merit(p,c) is determined. The thread with the highest merit function, Merit(p,c), may be determined to be the "thread most likely to run next" and its associated adaptive partition may be billed accordingly for the running time of the thread holding the mutex once the adaptive partition associated with the thread holding the mutex has exhausted its guranteed CPU budget.

Each CPU of a multiprocessor system runs its own instance of the adaptive partition scheduler. The executions of the multiple instances may occur at separate times or simultaneously. The multiple instances of the adaptive partition scheduler running on each CPU may evaluate merit functions, Merit(p,c), for the adaptive partitions running on a respective CPU without the necessity of communicating with other CPUs of the system. An instance of the adaptive partition scheduler running on a CPU may evaluate its merit functions, Merit(p,c) without messaging, interrupting, and/or interrogating an instance of an adaptive partition scheduler running on another CPU.

Some values used by the adaptive partition scheduler's may be simultaneously readable by all CPUs. These values include the helper functions, such as HAS_BUDGET_GLOBALLY(p), and constant properties of partitions, such as GLOBAL_BUDGET_IN_TICKS(p). Although exclusion locks may be employed to access these values, the system may be implemented without such exclusion locks.

An exclusion lock may be used during microbilling when one CPU adds a quantity of execution time to the account for a partition. The exclusion lock may be limited to a very small locked window duration and may be implemented with any number of atomic and/or uninterruptable operations to read, add, and/or write a value. This may be accomplished using a spinlock.

The systems and methods described above may be configured to run in a transaction processing system where it may be more important to continue to process some fraction of the offered load rather than to fail completely in the event of an overload of processing capacity of the system. Examples of such applications include Internet routers and telephone switches. The systems and methods also may be configured to run in other real-time operating system environments, such as automotive and aerospace environments, where critical processes may be designated that need to be executed during critical events. An example may be in an automotive environment, where an airbag deployment event is a low probability event, but must be allocated processor budget should the event be initiated.

The systems and methods also may be configured to operate in an environment where untrusted applications may be in use. In such situations, applications such as Java applets may be downloaded to execute in the operating system, but the nature of the application may allow the untrusted application to take over the system and create an infinite loop. The operating system designer may not want such a situation, and may create appropriate adaptive partitions so the untrusted application may be run in isolation, while limiting access to CPU time which other processes will have need of.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for operating a symmetric multiprocessing system comprising:
   associating a first adaptive partition processing scheduler with a first processing unit of the symmetric multiprocessing system;
   determining a merit function for each of a plurality of adaptive partitions associated with the first processing unit, where each adaptive partition associated with the first processing unit comprises a plurality of process threads, and where the merit function for each adaptive partition is based, at least in part, on whether the adaptive partition has available budget on the first processing unit;

assigning budgets for use by each partition of the adaptive partitions associated with the first processing unit based on a number of ticks occurring during an averaging window;

affirmatively determining that an adaptive partition associated with the first processing unit has available budget on the first processing unit when a number of ticks used by the adaptive partition associated with the first processing unit during a current averaging window is less than or equal to a number of ticks assigned as a budget to the adaptive partition for the first processing unit;

selectively allocating, using the first adaptive partition processing scheduler, the first processing unit of the symmetric multiprocessing system to run process threads of the adaptive partitions associated with the first processing unit based on a comparison between merit function values of the adaptive partitions associated with the first processing unit;

associating a second adaptive partition processing scheduler with a second processing unit of the symmetric multiprocessing system;

determining a merit function for each of a plurality of adaptive partitions associated with the second processing unit, where each adaptive partition associated with the second processing unit comprises a plurality of process threads, and where the merit function for each adaptive partition is based, at least in part, on whether the adaptive partition has available budget on the second processing unit; and selectively allocating using the second adaptive partition processing scheduler, the second processing unit of the symmetric multiprocessing system to run process threads of the adaptive partitions associated with the second processing unit based on a comparison between merit function values of the adaptive partitions associated with the second processing unit.

2. The method of claim 1, further comprising:
assigning budgets for use by each partition of the adaptive partitions associated with the second processing unit based on a number of ticks occurring during an averaging window; and
affirmatively determining that an adaptive partition associated with the second processing unit has available budget on the second processing unit when a number of ticks used by the adaptive partition associated with the second processing unit during a current averaging window is less than or equal to a number of ticks assigned as a budget to the adaptive partition for the second processing unit.

3. The method of claim 1, further comprising:
determining the merit function for a particular partition, p, of the adaptive partitions associated with the first processing unit scheduler based, at least in part, on whether the adaptive partition has available global budget on the symmetric multiprocessing system.

4. The method of claim 2, further comprising:
assigning a global budget for use by each partition of the adaptive partitions associated with the first processing unit based on a number of ticks occurring during an averaging window; and
affirmatively determining that an adaptive partition has available global budget on the first processing unit when a number of ticks used globally by the adaptive partition during a current averaging window is less than or equal to a number of ticks assigned as a global budget to the adaptive partition.

5. The method of claim 2, further comprising:
determining the merit function for a particular partition, p, of the adaptive partitions associated with the second processing unit scheduler based, at least in part, on whether the adaptive partition has available global budget on the symmetric multiprocessing system.

6. The method of claim 5, further comprising:
assigning a global budget for use by each partition of the adaptive partitions associated with the second processing unit based on a number of ticks occurring during an averaging window; and
affirmatively determining that an adaptive partition has available global budget on the second processing unit when a number of ticks used globally by the adaptive partition during a current averaging window is less than or equal to a number of ticks assigned as a global budget to the adaptive partition.

7. The method of claim 1, further comprising:
determining the merit function for each partition, p, of the adaptive partitions associated with the first processing unit based, at least in part, on whether the adaptive partition has available global budget on the symmetric multiprocessing system; and
determining the merit function for each partition, p, of the adaptive partitions associated with the second processing unit based, at least in part, on whether the adaptive partition has available global budget on the symmetric multiprocessing system.

8. The method of claim 1, further comprising:
determining the merit function for each partition, p, of the adaptive partitions associated with the first processing unit based, at least in part, on a priority value of a highest priority thread in the partition of the first processing unit; and
determining the merit function for each of the adaptive partitions associated with the second processing unit based, at least in part, on a priority value of a highest priority thread in the partition of the second processing unit.

9. The method of claim 1, further comprising binding the threads of the adaptive partitions associated with the first and second processing units to one or both of the first and second processing units.

10. A method of operating a symmetric multiprocessing system having a plurality of processing units comprising:
instantiating an adaptive partition processing scheduler with respect to each of the plurality of processing units of the symmetric multiprocessing system;
assigning a budget for use by a partition of the one or more adaptive partitions based on a number of ticks occurring during an averaging window; and
determining that an adaptive partition has available budget on a corresponding processing unit when a number of ticks used by the adaptive partition during a current averaging window is less than or equal to a number of ticks assigned as a budget to the adaptive partition for the corresponding processing unit;
selectively allocating a corresponding processing unit of the symmetric multiprocessing system to run process threads of one or more adaptive partitions associated with the instantiated adaptive partition processing scheduler based on a comparison between merit function values of the one or more adaptive partitions, where each of the one or more adaptive partitions comprises a plurality of process threads, where the merit function for a particular partition, p, of the one or more adaptive partitions associated with an adaptive partition scheduler instance is based, at least in part, on whether the adaptive partition has available global budget on the corresponding processing unit of the symmetric multiprocessing system.

11. The method of claim 10, further comprising basing a budget assigned to and used by a partition of the one or more adaptive partitions on a number of ticks occurring during an averaging window, where an adaptive partition has available global budget on a corresponding processing unit when a number of ticks used globally by the adaptive partition during a current averaging window is less than or equal to a number of ticks assigned as a global budget to the adaptive partition.

12. The method of claim 10, further comprising basing the merit function for a particular partition, p, of the one or more adaptive partitions associated with an adaptive partition scheduler instance, at least in part, on a priority value of a highest priority thread in the particular partition.

13. The method of claim 10, further comprising binding process threads to particular processors of the symmetric multiprocessing system.

14. A method for operating a bound multiprocessing system comprising:
  instantiating an adaptive partition processing scheduler with respect to each of a plurality of processing units in the bound multiprocessing system;
  assigning a budget for use by a partition of the one or more adaptive partitions based on a number of ticks occurring during an averaging window;
  determining that an adaptive partition has available budget on a corresponding processing unit when a number of ticks used by the adaptive partition during a current averaging window is less than or equal to a number of ticks assigned as a budget to the adaptive partition for the corresponding processing unit
  executing the instantiated adaptive partition processing schedulers to selectively allocate corresponding processing units of the bound multiprocessing system to run process threads of one or more adaptive partitions, where each of the adaptive partitions comprises a plurality of process threads,
  determining a merit function value for each of the one or more adaptive partitions based, at least in part, on whether the adaptive partition has available global budget on the corresponding processing unit of the bound multiprocessing system; and
  running process threads of the one or more adaptive partitions based on a comparison between merit function values of the one or more adaptive partitions.

15. The bound multiprocessing system of claim 14, further comprising assigning a budget for use by a partition of the one or more adaptive partitions based on a number of ticks occurring during an averaging window, where an adaptive partition has available global budget on a corresponding processing unit when a number of ticks used globally by the adaptive partition during a current averaging window is less than or equal to a number of ticks assigned as a global budget to the adaptive partition.

* * * * *